Oct. 20, 1931.　　A. J. DOTTERWEICH　　1,828,282
WATER SOFTENER
Filed July 7, 1928　　2 Sheets-Sheet 1
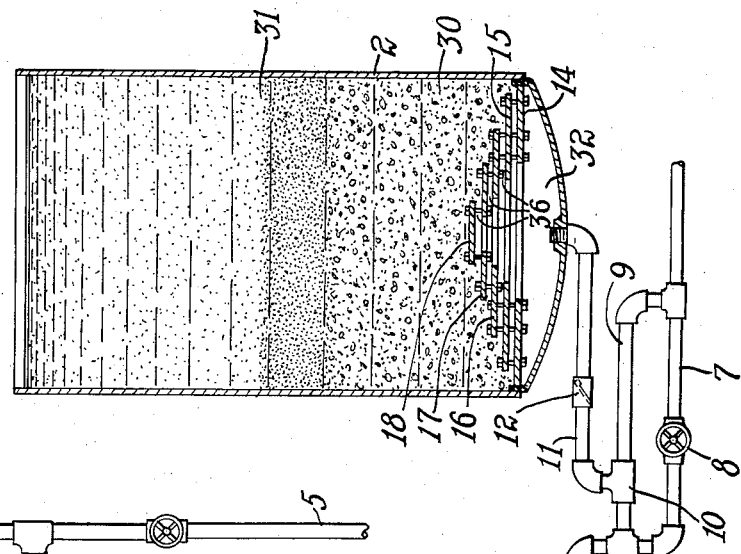
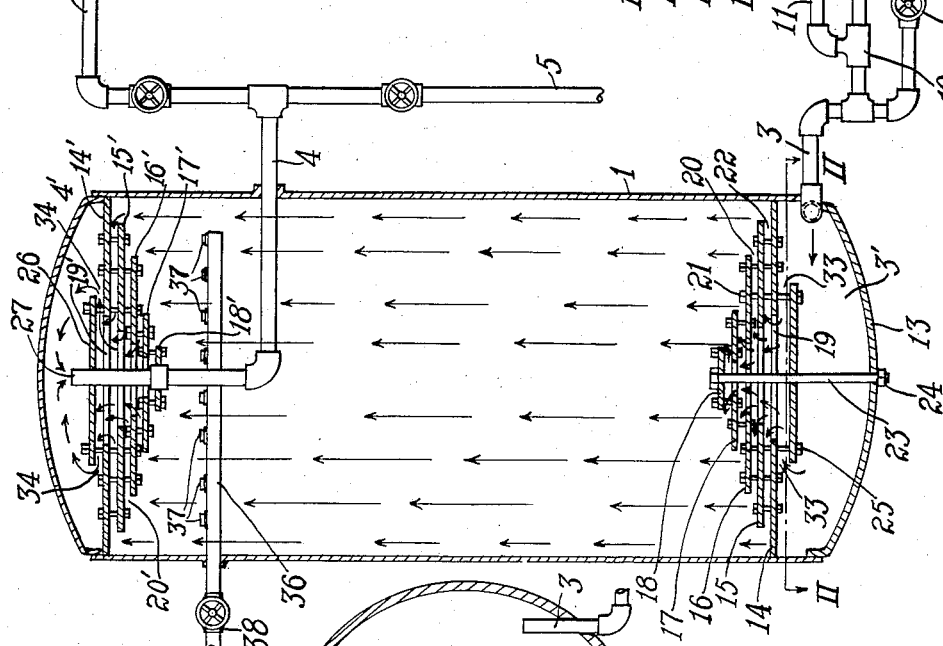
WITNESS:
H. J. Procter
INVENTOR.
Andrew J. Dotterweich
BY William B. Jaspert
ATTORNEYS.

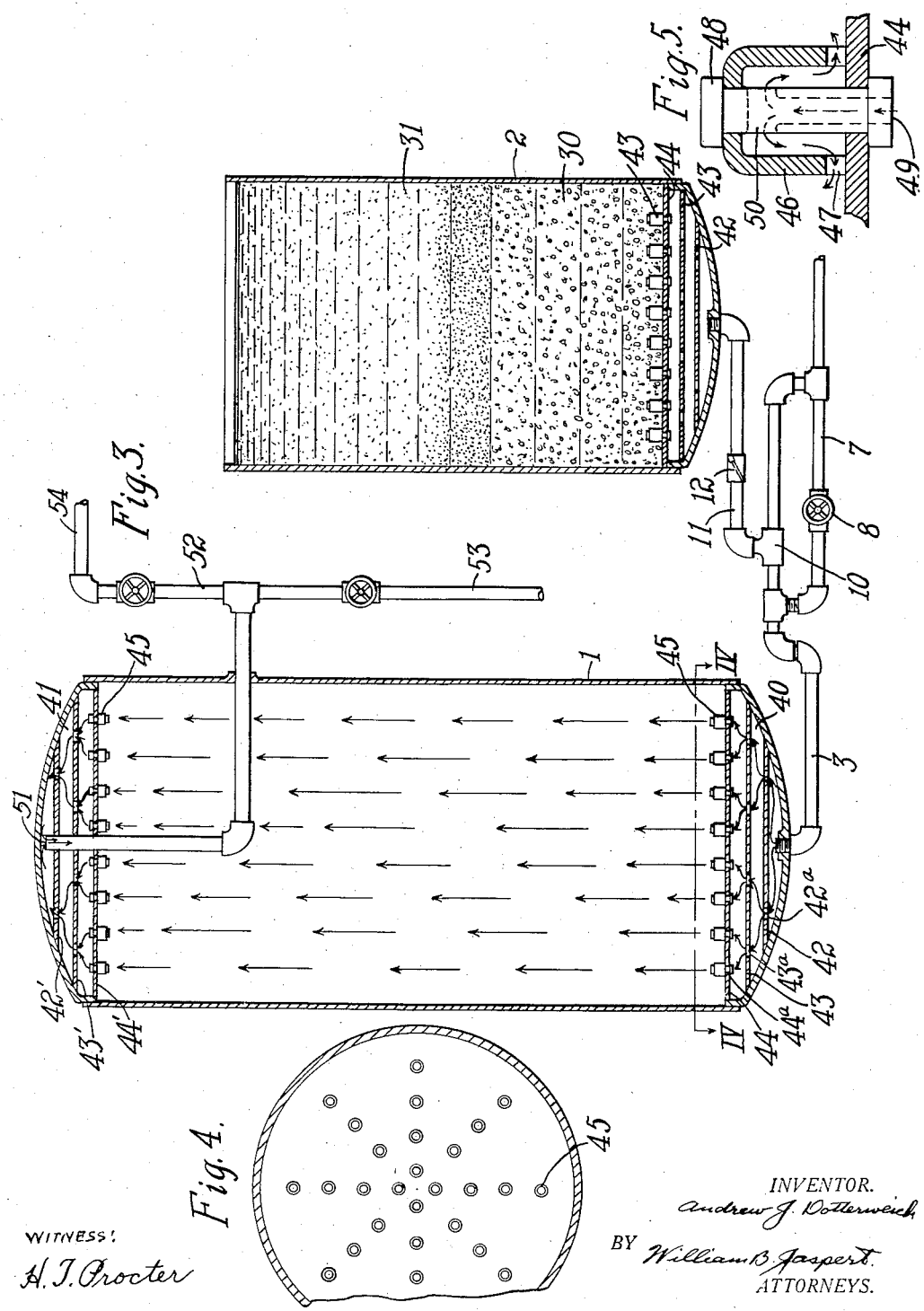

Patented Oct. 20, 1931

1,828,282

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

WATER SOFTENER

Application filed July 7, 1928. Serial No. 290,960.

This invention relates to water softening apparatus of the type employing a softening agent such as zeolite which is adapted to be regenerated by a salt solution at intervals.

In a co-pending application Serial No. 242,612, filed December 27, 1927, I have disclosed a water softening apparatus employing means in the form of a plurality of strainer nozzles for effecting a substantially uniform distribution of the flow of water through the softening material for the purpose of making the softening agent more effective in softening a larger volume of water than is practical with present equipment, and to more efficiently effect regeneration of the softening agent by the salt solution at the end of the softening period.

The present invention has for its object the provision of means for effecting an equal distribution of the water and salt solutions to pass through the bed of softening material and provides a structure of simple, compact and inexpensive design which is adapted to distribute the flow of these fluids in a highly efficient manner.

Another object of the invention is the provision of means for substantially eliminating the clogging of the fluid passages by gravel or the softening material.

Another object is to prevent the forming of salt pockets in the softening system.

These and other objects will become more apparent from a consideration of the accompanying drawings in which like reference characters designate like parts and in which Fig. 1 is a sectional elevational view of apparatus embodying the principles of this invention; Fig. 2 a plan view of the bottom of the softening tank taken along the line II—II, Fig. 1; Fig. 3 a sectional view of a modified form of apparatus embodying the equalizer flow principle; Fig. 4 a plan view taken along the line IV—IV, Fig. 3; and Fig. 5 a sectional elevational view of a strainer nozzle.

In the drawings 1 designates the softening tank and 2 the tank in which the regenerating material is stored. The tank 1 is provided with an inlet connection 3 leading to an inlet chamber 3' and an outlet connection 4 leading from the outlet chamber 4' to a drain 5 and to a service line or point of use 6.

The inlet 3 is connected by a pipe line 7 to a source of raw water supply, the line 7 being provided with a valve 8 to control the flow of water to the softening tank 1. A by-pass 9 is provided in which an injector 10 is connected leading by a branch line 11 to the bottom of the tank 2 containing the salt solution. The branch line 11 is provided with a check valve 12 to prevent the reverse flow of water, and the injector 10 is adapted to draw a solution of the brine by the branch line 11 into the water flowing to the inlet 3 of the softening tank 1 when the main passage of line 7 is throttled by the valve 8.

As shown in Fig. 1, the tank is provided with a curved bottom 13 and the inlet pipe 3 is off-set with the path of flow tangentially disposed with respect to the periphery of the tank. The purpose of so placing the inlet 3 is to produce a swirling action of the water flowing into the tank to cause a complete intermingling and to prevent the formation of salt pockets since all the fluid is rotating. Another advantage of so placing the inlet results from the kinetic energy of the fluid being lost which causes the fluid, especially the salt solution, to be well distributed in the softener, and later incoming water to flush out the salt solution from the lower compartment or chamber.

The tank 1 is provided with a series of baffle plates 14, 15, 16, 17 and 18, the plates 14 to 17 inclusive being in the form of an annulus having a central opening 19. The central openings 19 of the different plates are of different diameters as shown in the drawings for the purpose of restricting the flow of water through the central passage formed by the successive plates.

The plates are also shown to be of different outer diameters for the purpose of providing a series of outlets 20 which establish a path of the flow of water from the bottom to the top of the tank in a manner and for a purpose hereinafter explained. The plates 14 to 18 are disposed in superposed relation and secured by bolts or rivets 21 to form a unitary structure which is supported by welding the bottom plate 14 at 22 to the inner wall of tank 1 and further by securing the assembled structure with a screw bolt 23 that is fastened at 24 to the bottom 13 of the softening tank.

To further insure even distribution of water flowing through tank 1, a plate 25 is provided below the central opening 19 of the lowermost plate 14. The plate 25 establishes an inlet passage 33 with the plate 14 for the flow of water into the conically shaped passage formed by the different size openings at 19 in the baffle plates and the water passing between the plates will pass out at the outer peripheral passages 20 in proportion to the size of the openings 19 so that a larger quantity of water will flow out between plates 14 and 15 than between the upper plates 17 and 18, the flow being proportionate to the different cross-sectional areas at the passages 19.

A similar baffle structure may be provided at the top of the softening tank 1 and a plate 26 is employed as a baffle member to establish an outlet passage 34 with the plate 14'. In the upper baffle structure the plates 14' to 18' are preferably of the same dimensions as the plates in the lower baffle member but are disposed with the largest plate at the top of the structure and the smaller one underneath. The spacing between these plates is preferably of such dimension as to readily permit the passage of water but will retain within the container coarse zeolite or other materials placed therein as a means for preventing the escape of fine zeolite granules, this for the reason that it is desirable to employ fine zeolite sands to obtain maximum capacity of softening per regeneration.

The use of finer zeolite becomes a matter of concern and therefore as a means to overcome this difficulty, a layer of a material, somewhat lighter in weight but of a coarser structure than the zeolite, is placed on the zeolite bed. This lighter material such as coke for use with the natural zeolite, is of such coarse structure that the individual grains will not pass through the openings 20' with water flowing upwardly and lifting this matter against the upper plates, thereby preventing the passage of the fine zeolite material.

To provide for clearing the upper plates of foreign matter, there is provided below these plates a water collecting system 36 having suitable spaced outlets 37 and a valved outlet 38. If the plates 14' to 18' become clogged, water under pressure is forced through pipe 4 and with other outlets closed, the water will pass out at 27, though the various passages between the plates and thence out to a drain through collectors 37, distributor 36 and the opened valve 38, carrying such foreign matter away from the system for dismissal.

The softening agent such as zeolite is charged in the tank in the space between the upper and lower baffle members but the tank is not completey filled so that a space is provided between the upper baffle and the top of the zeolite bed to permit of the mechanical loosening up of the zeolite material by a backwashing operation when it is desired to regenerate the softening material. The spacing 20 between the lower baffles is such as to prevent the zeolite from washing down into the bottom of the softening tank with the settling of the zeolite bed, but if desired a bed of gravel may be placed on top of the baffle member below the zeolite bed to prevent the material escaping between the spacing of the plates in the event it is desired to have the water flow downwardly rather than in an upward direction.

In the operation of the softener water flows from the supply line 7 through the inlet chamber 3 into the bottom of the tank 1 and rises around the plate 25 passing through the central passage provided by the openings 19 of the baffle member and flows between the spacing of the plates past the outer periphery of adjacent plates upwardly in substantially vertical lines to the passage between the upper baffle members which are in alinement with the corresponding passage of the lower baffle member, the path of flow being graphically represented by the dotted lines and arrows.

In proportioning the openings of the various plates at 19 and 19', consideration is given to the fact that for an even distribution of water or a brine solution, it is necessary that the paths travelled by either water or brine in passing through the softening material must be substantially of a given and equal length for each path travelled from inlet to outlet regardless of the path travelled and accordingly the structures employed have such diameters and openings which in combination with plates 25 and 26 will permit the lengths of paths starting at 33 to 34 to be substantially or identically the same. The length of paths should be substantially equal whether the water will pass from 33 between plates 14 and 15 up through the zeolite through the zeolite through the path between plates 14' and 15' to 34 or a path starting at 33 and through any other passages between these lower plates to corresponding passages in the upper plates to the outlet 34. After the water enters the passage provided by the openings 19' in the upper baffle members, it flows around the baffle plate 26 into the mouth 27 of the outlet pipe 4.

With the baffle structure illustrated, the flow of water upwardly through the center of the lower plate 14 and out at the space at the periphery of the plate 15, will be in accord with the diameter 19 of the plate 14 and on account of the lesser opening 19 in the plate a proportionately smaller quantity of water will flow out between plates 16 and 15, the amount decreasing upwardly in proportion to the size of the openings 19 in the upper plate. In this manner uniform distribution of the flow of water through the softening material is effected, the advantages of which has been set forth in detail in the co-pending application referred to above.

Since the water flows upwardly for all of the operations of softening, regenerating and flushing, material such as gravel will be kept out of the space between the baffle plates.

Referring to the brine tank 2 a baffle structure similar to that of the softening tank is employed in connection with a gravel bed 30 above which the brine solution 31 is maintained. The brine tank is open at the top and a concentrated solution of brine is maintained which flows through the gravel bed into the bottom portion 32 of the brine tank from which it is conducted by the branch line 11 to the injector 10 when the valve 8 is manipulated to cause a flow of raw water through the by-pass 9 to pick up the salt solution from the injector to conduct it through the inlet 3 to the water softening tank 1 for the purpose of regenerating the zeolite bed. As previously explained in connection with the baffle plate structures in the softening tanks 1 the spacing of the plates is such as will prevent gravel 30 clogging the path of brine from the interior of the tank to the brine collecting chamber 32. Furthermore, the baffle plate structure when employed in the brine tank, will produce uniform flow of water through the undissolved salt resulting consistently in a saturated brine solution.

In the modification shown in Figs. 3, 4 and 5 the softening tank and brine tank are provided with means for distributing the flow of brine through the softening material and the regenerating material in a manner similar to that explained above. As shown in Fig. 3 the lower and upper chambers generally designated at 40 and 41 respectively are provided with plates 42 and 43 and 44 which are in superposed relation, these plates being provided with openings 42a, 43a and 44a respectively. Fluid flowing from the pipe line 3 is conducted to the chamber 40 passing through a central opening therein, and the openings 42a, 43a, and 44a are mathematically spaced to be in staggered relation for the purpose of effecting a loss of head whereby distribution of the fluid is effected.

Plates 44 and 44' are provided with strainer nozzles 45 of the type illustrated in Fig. 5 which consists of a thimble-like member 46 having slotted openings 47 and which are secured to the plate 44 by bolts 48. The bolts are provided with a central passage 49 having a transverse opening 50 whereby fluid flowing from below the plate 44 passes through the opening 49 of the bolt 48 to the interior of member 46 and thence out at the bottom openings 47 into the central chamber of the tank. The nozzles 45 are distributed in any suitable manner as shown in Fig. 4, corresponding in number and spacing to the number and location of the openings 43a and 42a.

With this arrangement equal distribution of water or brine is effected through the softening material disposed between the upper and lower chambers of the softening tank, the path of flow being indicated by arrows in Fig. 3. The fluid is collected in the upper chamber 41 in the reverse manner of its distribution through the lower chamber 40, passing through the nozzles 45 and the openings 43a' and 42a' into a collector pipe 51 leading to the service line 52 and thence to a drain 53 or point of use through the line 54. The function of the distribution in the brine tank is similar to that explained in connection with the apparatus shown in Fig. 1 in that it will produce uniform flow of water through the undissolved salt resulting consistently in a salt brine solution passing to the softening tank for regenerating the softening material.

It is evident from the foregoing description of this invention that a softening apparatus embodying the features therein described provides for uniform distribution of the flow of water through the softening material and that the baffle members constructed in the manner shown and described, provides means for supporting gravel and zeolite beds in a manner to render them most effective for use and at the same time prevent the accumulation of materials in the parts of the tank which are desired to be maintained opened for the flow of either water or brine solution therethrough. It is further evident that the baffle plate structure provides for the establishment of a plurality of paths of uniform length through the filtering or softening agent and that the structure is relatively simple in design and inexpensive to manufacture.

Although one embodiment of the invention has been herein illustrated and described, it will be obvious to those skilled in the art that various modifications may be made in the details of construction without departing from the principles herein set forth.

I claim:

1. Apparatus for softening water comprising a tank having inlet and outlet passages and baffle members disposed between said passages, said baffle members comprising a plurality of plates of different outside diameters arranged in superposed relation and having spaces therebetween, said plates having central openings therein of different diameters, the openings decreasing in size from the larger to the smaller plates.

2. In a water softening system a brine tank having a baffle member, a gravel bed supported by said baffle member and a salt bed supported by said gravel bed, said baffle member comprising a series of plates in superposed relation and of progressively different sizes and having openings therein of correspondingly varying diameters and being spaced from each other in a manner to prevent the passing of gravel through the baffle structure, said baffle member occupying substantially the entire cross sectional area of the tank.

3. A flow distributor for a water softener comprising a pile of superposed spaced annular plates of progressively different outside diameters and having their inside diameters progressively decreasing from the larger to the smaller plates.

4. A water softening tank having flow distributing devices respectively above and below the contained water softening material, said devices constructed and arranged to induce a substantially uniform flow throughout the water softening material of liquid passing through the tank, each of said devices comprising a single pile of superposed annular baffle plates of progressively different outside diameters and having their inside diameters progressively decreasing from the larger to the smaller plates, each pile occupying substantially the entire cross sectional area of the tank, and the respective distributors being arranged with their plates of smallest diameter confronting one another, so that the liquid has its egress from the distributor in the inlet end of the tank in a plurality of annular outlet spaces all concentric with the tank and is received into the distributor in the opposite end through correspondingly arranged spaces.

In testimony whereof I have hereunto set my hand this 30 day of June, 1928, at Pittsburgh, Pa.

ANDREW J. DOTTERWEICH.